United States Patent
Kaufmann et al.

(10) Patent No.: US 11,897,445 B2
(45) Date of Patent: Feb. 13, 2024

(54) APPARATUS AND METHOD FOR DETERMINING A ROTATIONAL SPEED OF AT LEAST ONE WHEEL OF A VEHICLE

(71) Applicant: Knorr-Bremse Systeme Fuer Nutzfahrzeuge Gmbh, Munich (DE)

(72) Inventors: Christian Kaufmann, Sindelfingen (DE); Falk Hecker, Markgroeningen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 383 days.

(21) Appl. No.: 17/420,931

(22) PCT Filed: Dec. 19, 2019

(86) PCT No.: PCT/EP2019/086249
§ 371 (c)(1),
(2) Date: Jul. 6, 2021

(87) PCT Pub. No.: WO2020/144038
PCT Pub. Date: Jul. 16, 2020

(65) Prior Publication Data
US 2022/0063578 A1    Mar. 3, 2022

(30) Foreign Application Priority Data
Jan. 9, 2019    (DE) .................... 10 2019 100 354.7

(51) Int. Cl.
*B60T 8/88*    (2006.01)
*B60T 8/171*    (2006.01)

(52) U.S. Cl.
CPC .............. *B60T 8/885* (2013.01); *B60T 8/171* (2013.01); *B60T 2270/413* (2013.01); *B60T 2270/414* (2013.01)

(58) Field of Classification Search
CPC .... B60T 8/885; B60T 8/171; B60T 2270/413; B60T 2270/414; B60T 8/88; F16D 2066/003
(Continued)

(56) References Cited

U.S. PATENT DOCUMENTS

2018/0290642 A1*  10/2018  Tschiene ................. B60T 8/885

FOREIGN PATENT DOCUMENTS

| CN | 103195922 | * | 7/2013 |
| DE | 4133268 A1 | | 4/1993 |

(Continued)

OTHER PUBLICATIONS

International Search Report for PCT/EP2019/086249 dated Mar. 11, 2020.

*Primary Examiner* — Muhammad Shafi
(74) *Attorney, Agent, or Firm* — NORTON ROSE FULBRIGHT US LLP; Gerard A. Messina

(57) ABSTRACT

An apparatus for determining a rotational speed of at least one wheel of a vehicle, including: a detection device for detecting an angular velocity of the wheel that is correlated to the rotational speed, wherein the detection device is configured to provide an electrical detection signal depending on the angular velocity detected; a first control unit with a first measurement device for measuring the detection signal, wherein the first control unit is electrically joined to the detection device; and a second control unit with a second measurement device for measuring the detection signal, wherein the second control unit is electrically joined to the detection device, wherein the detection device can be electrically switched or is electrically switched between the first measurement device and the second measurement device. Also described is a related method.

11 Claims, 2 Drawing Sheets

(58) Field of Classification Search
USPC .......................................................... 701/29.2
See application file for complete search history.

(56) References Cited

FOREIGN PATENT DOCUMENTS

| | | |
|---|---|---|
| DE | 19635440 A1 | 3/1998 |
| DE | 102014221901 A1 | 4/2016 |
| DE | 102015209565 A1 | 12/2016 |
| DE | 102016222628 * | 5/2018 |
| DE | 102016222628 A1 | 5/2018 |

* cited by examiner

APPARATUS AND METHOD FOR DETERMINING A ROTATIONAL SPEED OF AT LEAST ONE WHEEL OF A VEHICLE

FIELD OF THE INVENTION

The present invention relates to an apparatus for determining a rotational speed of at least one wheel of a vehicle and to an associated method.

BACKGROUND INFORMATION

In highly automated driving a driver of a vehicle does not, for example, have to sit permanently in a driver's seat and be available for a corrective manipulation. Conventional fallback levels cannot therefore be used in critical situations. If a primary braking system is not available, a redundant braking system should take over the driver's tasks. If redundancy is present, then in order, for example, to model ABS functionality, both brake systems should, conventionally, read signals from rotational speed sensors of wheels.

SUMMARY OF THE INVENTION

Against this background it is an object of the present invention to create an improved apparatus for determining a rotational speed of at least one wheel of a vehicle and an improved method for determining a rotational speed of at least one wheel of a vehicle.

This object may be achieved by an apparatus for determining a rotational speed of at least one wheel of a vehicle and by a method for determining a rotational speed of at least one wheel of a vehicle in accordance with the principal descriptions herein.

In accordance with embodiments, in particular a sensor signal from an active rotational speed sensor is redundantly read, used and, additionally or alternatively, evaluated, to determine a rotational speed of a wheel of a vehicle. The sensor signal can be accessed for this purpose by a first control unit and by a second control unit, such that in the event of a malfunction of one of the control units, the sensor signal can be accessed by the correctly operating control unit. The sensor signal can thereby be accessed or read, used and, additionally or alternatively, evaluated, at least by one control unit.

In accordance with embodiments a redundancy in respect of a rotational speed sensor can advantageously be established, in particular in a space-saving manner, without having to implement the sensor twice. A redundant usage of an active rotational speed sensor can also thus be achieved in an economical manner, since each additional sensor would entail increased costs. For example, an ABS functionality can be realized in a simple manner for redundantly constructed brake systems. Costs and space can thus be saved through the redundant use of a single rotational speed sensor.

An apparatus for determining a rotational speed of at least one wheel of a vehicle is disclosed, wherein the apparatus has the following features:

a detection device for detecting an angular velocity of the wheel that is correlated to the rotational speed, wherein the detection device is configured to provide an electrical detection signal depending on the angular velocity detected;

a first control unit with a first measurement device for measuring the detection signal, wherein the first control unit is electrically joined to the detection device; and a second control unit with a second measurement device for measuring the detection signal, wherein the second control unit is electrically joined to the detection device, wherein the detection device can be electrically switched or is electrically switched between the first measurement device and the second measurement device.

The vehicle can be a commercial vehicle such as, for example, a truck or the like. The control units can be microcontrollers or the like. The detection device can act as a controlled current source. The electrical detection signal can be a current signal. Measuring the detection signal can refer to ascertaining a signal characteristic or signal property of the detection signal. Electrically joined can refer to a connection by electrical cables.

According to one embodiment, the first control unit can comprise at least one first switching device that is configured to interrupt a transmission of the detection signal between the first measurement device and the detection device in the event of a malfunction of the first control unit. The second control unit can comprise at least one second switching device that is configured to interrupt a transmission of the detection signal between the second measurement device and the detection device in the event of a malfunction of the second control unit. A malfunction can represent a failure of a component or power supply of a control unit. When in a state not supplied with electrical energy, each switching device can adopt an open position in which a flow of electrical current is interrupted. Such an embodiment has the advantage that a use of the detection signal can be realized in a simple and reliable manner only by control units that are operating without fault.

The first measurement device can here be electrically connected between a first switching device and the detection device. The second measurement device can be electrically connected between a second switching device and the detection device. Such an embodiment has the advantage that the use of the detection signal by at least one control unit can be enabled in a reliable and economical manner.

The detection device can further be configured to provide the detection signal with electrical current level sequences that depend on the angular velocity. Such an embodiment offers the advantage that a reliable and accurate determination of the rotational speed can be enabled.

The first control unit can also be part of a first redundancy level of a braking system of the vehicle. The second control unit can be a part of a second redundancy level of the braking system of the vehicle. Each redundancy level can comprise at least one energy supply of its own and a control unit of its own. Such an embodiment has the advantage that the detection signal can be used directly by components that are in any case provided. The apparatus can be realized in an economical and space-saving manner in this way too.

According to one embodiment the first measurement device can comprise a first electrical current measurement resistor and a first evaluation device for evaluating a voltage drop across the first current measurement resistor. The second measurement device can comprise a second electrical current measurement resistor and a second evaluation device for evaluating a voltage drop across the second current measurement resistor. Such an embodiment offers the advantage that the rotational speed can be determined in a simple and accurate manner.

The second evaluation device can here be electrically connected in parallel with the second current measurement resistor. The first measurement device can comprise a differential instrumentation amplifier that is electrically connected in parallel with the first current measurement resistor.

The first evaluation device can be connected to the instrumentation amplifier. The instrumentation amplifier can be an operational amplifier. Such an embodiment offers the advantage that an elaborate and exact determination of the rotational speed can be enabled in a redundant manner.

The first control unit can also here comprise a first high-side switch, a first low-side switch, a first electrical voltage source and a first ground terminal. The first voltage source and the first ground terminal can be electrically connected between the first high-side switch and the first low-side switch. The first current measurement resistor can be electrically connected between the first high-side switch and the detection device. The second control unit can comprise a second high-side switch, a second low-side switch, a second electrical voltage source and a second ground terminal. The second voltage source and the second ground terminal can be electrically connected between the second high-side switch and the second low-side switch. The second current measurement resistor can be electrically connected between the second low-side switch and the detection device. Such an embodiment has the advantage that a use of the detection signal by at least one control unit operating without fault can be achieved in an economical and space-saving manner in order to realize a redundant determination of the rotational speed.

The first control unit here can comprise an additional first current measurement resistor that is electrically connected between the first voltage source and the first low-side switch or between the first low-side switch and the detection device. The second control unit can comprise an additional second current measurement resistor that is electrically connected between the detection device and the second high-side switch or between the second high-side switch and the second voltage source. An additional evaluation device can be assigned to each additional current measurement resistor. Such an embodiment has the advantage that the measurement of the detection signal can take place yet more accurately and reliably.

A method for determining a rotational speed of at least one wheel of a vehicle is also disclosed, wherein the method can be carried out making use of an embodiment of the apparatus referred to above, wherein the method has the following steps:

detecting an angular velocity of the wheel that is correlated to the rotational speed making use of the detection device to provide an electrical detection signal depending on the angular velocity detected; and measuring the detection signal making use of the first control unit when the first control unit is operating without fault, making use of the second control unit when the second control unit is operating without fault, and making use of the first control unit and the second control unit when the first control unit and the second control unit are operating without fault in order to determine the rotational speed.

A use of the detection signal by both control units if both control units are operating without fault and by one control unit that is operating without fault in the event of a disturbance or failure of one of the control units in order to be able to determine the rotational speed redundantly in a simple and reliable manner can thus be realized.

Exemplary embodiments of the approach disclosed here are explained in more detail in the following description with reference to the figures.

DETAILED DESCRIPTION

Figure 1:
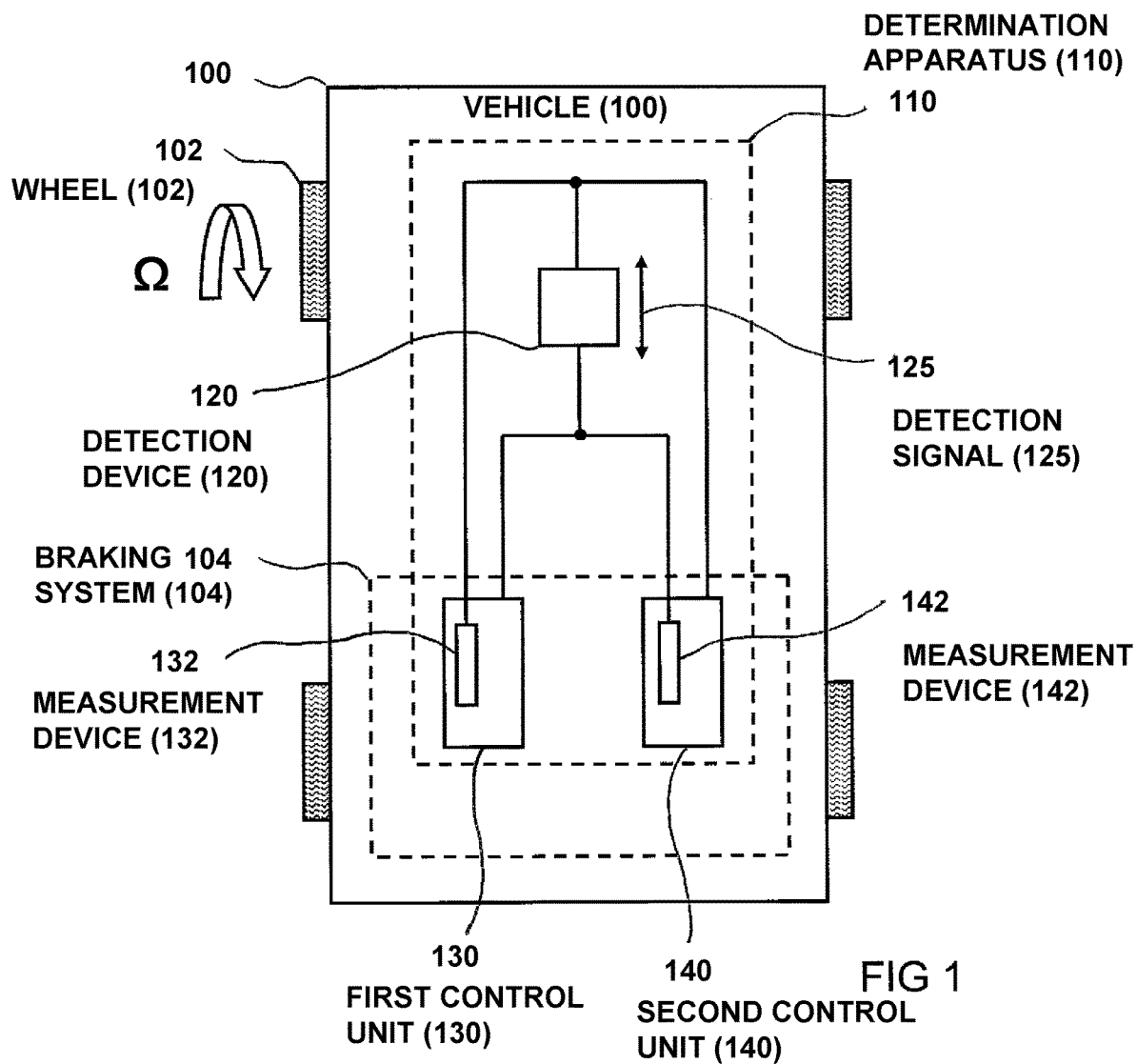
FIG. 1 shows a schematic illustration of a vehicle with an apparatus according to one exemplary embodiment.

FIG. 1 shows a schematic illustration of a vehicle 100 with an apparatus 110 for determination according to one exemplary embodiment. The vehicle 100 is a motor vehicle, for example a commercial vehicle, in particular a truck or the like. The vehicle 100 comprises a plurality of wheels 102. For reasons of clarity, only one wheel 102 is drawn explicitly in the illustration of FIG. 1. The wheel 102 can turn with an angular velocity $\Omega$ that is correlated to a rotational speed of the wheel 102.

The vehicle 100 comprises the apparatus 110 for determination, or a determination apparatus 110. The determination apparatus 110 is configured to determine the rotational speed of the wheel 102 or a plurality of wheels 102 of the vehicle 100. According to the exemplary embodiment illustrated here, the determination apparatus 110 comprises a detection device 120, a first control unit 130 and a second control unit 140. The detection device 120 is only shown here for one wheel, although the expert will recognize that a detection device 120 should be provided for each of the wheels 102.

The detection device 120 is configured to detect the angular velocity $\Omega$ of the wheel 102 that is correlated to the rotational speed of the wheel 102. The detection device 120 is assigned here to at least the wheel 102. According to one exemplary embodiment, the detection device 120 can also comprise a plurality of sensor elements that can be assigned to a plurality of wheels 102 of the vehicle 100. The determination apparatus 110 can, alternatively, comprise a plurality of detection devices 120 (one at each wheel) for a plurality of wheels 102 of the vehicle 100. The detection device 120 is configured to provide an electrical detection signal 125 depending on the angular velocity $\Omega$ detected. The detection signal 125 can comprise electrical current level sequences $I(\Omega)$ or level sequences of an electrical current that depend on the angular velocity $\Omega$. The detection device 120 can also be referred to as an angular velocity sensor 120.

The detection device 120 is electrically joined to the first control unit 130 and to the second control unit 140. The first control unit 130 and the second control unit 140 are thus also joined to the detection device 120 for signal transfer. The first control unit 130 comprises a first measurement device 132 for measuring the detection signal 125. The second control unit 140 comprises a second measurement device 142 for measuring the detection signal 125. The detection device 120 is electrically connected between the first measurement device 132 and the second measurement device 142. Put more precisely, the first control unit 130 and the second control unit 140 are joined together by a pair of electrical lines, while the detection device 120 is electrically joined to both electrical lines. A first of the electrical lines is joined to the first measurement device 132. A second of the electrical lines is joined to the second measurement device 142.

According to one exemplary embodiment, the vehicle 100 comprises a braking system 104 with a first level and a redundancy level, while the braking system 104 can also comprise sensors not illustrated in FIG. 1. The first control unit 130 here is part of the first level of the braking system 104, or is assigned to said level, while the second control unit 140 is part of the redundancy level of the braking system 104, or is assigned to said level.

The determination apparatus 110 is also considered in more detail below with reference to FIG. 2.

Figure 2:
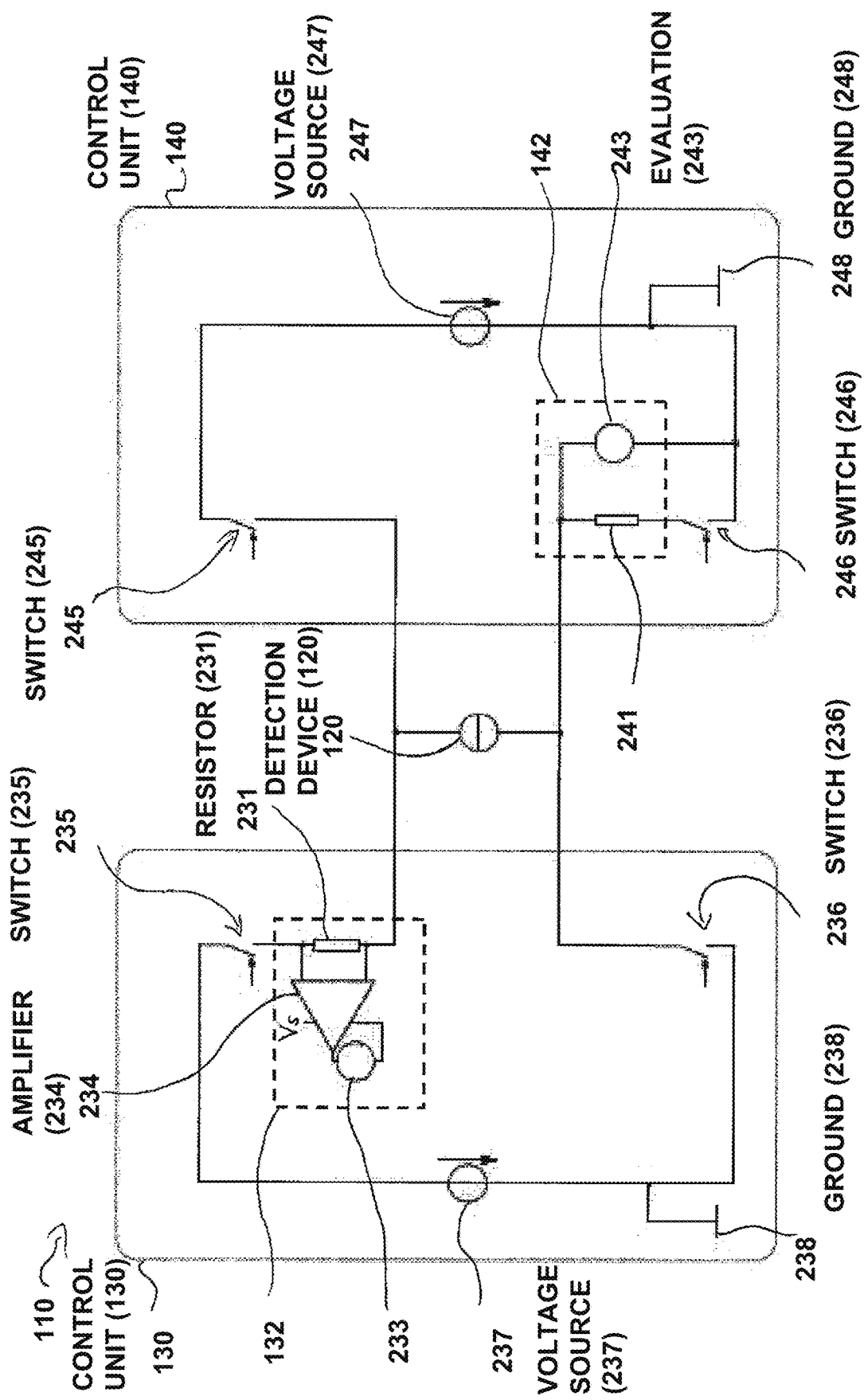
FIG. 2 shows a schematic illustration of an apparatus according to one exemplary embodiment.

FIG. 2 shows a schematic illustration of an apparatus 110 for determination, or a determination apparatus 110 according to one exemplary embodiment. The determination apparatus 110 here corresponds or is similar to the determination apparatus of FIG. 1. Put more precisely, the determination apparatus 110 corresponds to the determination apparatus of FIG. 1, while the determination apparatus 110 is merely illustrated in more detail in the illustration of FIG. 2.

According to the exemplary embodiment illustrated here, the first control unit 130 comprises a first electrical current measurement resistor 231, a first evaluation device 233, a differential instrumentation amplifier 234, a first high-side switch 235, a first low-side switch 236, a first electrical voltage source 237 and a first ground terminal 238. To be precise, the differential instrumentation amplifier 234 illustrated here is an operational amplifier that serves as a current mirror to reference the measurement value to GND. The first electrical current measurement resistor 231, the first evaluation device 233 and the differential instrumentation amplifier 234 are parts of the first measurement device 132. Expressed otherwise, the first measurement device 132 comprises the first electrical current measurement resistor 231, the first evaluation device 233 and the differential instrumentation amplifier 234.

The first evaluation device 233 is configured to evaluate a voltage drop across the first current measurement resistor 231. The instrumentation amplifier 234 is electrically connected in parallel with the first current measurement resistor 231. The first evaluation device 233 is connected to the instrumentation amplifier 234. The instrumentation amplifier 234 is connected to an electrical supply voltage Vs. The first evaluation device 233 works, for example, in accordance with what is known as the AK protocol of the Working Group of the Automotive Industry, or a similar protocol based on a controlled current source.

The first voltage source 237 and the first ground terminal 238 are electrically connected between the first high-side switch 235 and the first low-side switch 236. The first voltage source 237 is configured, though only by way of example, to provide an electrical voltage of 12 volts. The first current measurement resistor 231 is electrically connected between the first high-side switch 235 and the detection device 120. The first current measurement device 132 is thus electrically connected between the first high-side switch 235 and the detection device 120. The first high-side switch 235 and the first low-side switch 236 represent first switching devices. Each of the first switching devices is configured to interrupt a transmission or a transmission path of the detection signal between the first measurement device 132 and the detection device 120 in the event of a malfunction of the first control unit 130.

According to the exemplary embodiment illustrated here, the second control unit 140 comprises a second electrical current measurement resistor 241, a second evaluation device 243, a second high-side switch 245, a second low-side switch 246, a second electrical voltage source 247 and a second ground terminal 248. The second electrical current measurement resistor 241 and the second evaluation device 243 are parts of the second measurement device 142. Expressed otherwise, the second measurement device 142 comprises the second electrical current measurement resistor 241 and the second evaluation device 243.

The second evaluation device 243 is configured to evaluate a voltage drop across the second current measurement resistor 241. The second evaluation device 243 is connected for this purpose electrically in parallel with the second current measurement resistor 241. The second evaluation device 243 works, for example, in accordance with what is known as the AK protocol of the Working Group of the Automotive Industry, or a similar protocol based on a controlled current source.

The second voltage source 247 and the second ground terminal 248 are electrically connected between the second high-side switch 245 and the second low-side switch 246. The second voltage source 247 is configured, though only by way of example, to provide an electrical voltage of 12 volts. The second current measurement resistor 241 is electrically connected between the second low-side switch 246 and the detection device 120. The second current measurement device 142 is thus electrically connected between the second low-side switch 246 and the detection device 120. The second high-side switch 245 and the second low-side switch 246 represent second switching devices. Each of the second switching devices is configured to interrupt a transmission or a transmission path of the detection signal between the second measurement device 142 and the detection device 120 in the event of a malfunction of the second control unit 140.

According to one exemplary embodiment, the first control unit 130 comprises an additional first current measurement resistor or a first low-side current measurement resistor that is electrically connected between the first voltage source 237 and the first low-side switch 236 or between the first low-side switch 236 and the detection device 120. The second control unit 140 can here comprise an additional second current measurement resistor or a second high-side current measurement resistor that is electrically connected between the detection device 120 and the second high-side switch 245 or between the second high-side switch 245 and the second voltage source 247.

The measurement device disclosed here can also be arranged (on both sides) between the voltage source and switch.

Figure 3:
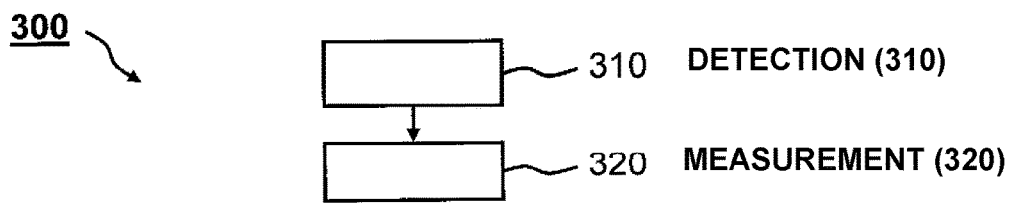
FIG. 3 shows a flow diagram of a method for determination according to one exemplary embodiment.

FIG. 3 shows a flow diagram of a method 300 for determination according to one exemplary embodiment. The method 300 for determination can be carried out in order to determine a rotational speed of at least one wheel of a vehicle. The method 300 for determination can be carried out making use of or by or in association with the apparatus from one of the figures described above or a similar apparatus.

In a step 310 of the detection, in the method 300 for determination, the angular velocity of the wheel that is correlated with the rotational speed is detected making use of the detection device of the apparatus, in order to provide the electrical detection signal depending on the angular velocity detected. The detection device is controlled here in an appropriate manner making use of a control signal. Subsequently, in a step 320 of the measurement, the detection signal is measured in order to determine the rotational speed. The step 320 of the measurement is carried out here making use of at least one of the control units. Put more precisely, the step 320 of the measurement is carried out making use of all of the control units that are operating without fault. In particular, the step 320 of the measurement is carried out making use of the first control unit when the first control unit is operating without fault, making use of the second control unit when the second control unit is operating without fault, and making use of the first control unit and the second control unit when the first control unit and the second control unit are operating without fault.

Expressed otherwise, and with reference to the figures described above, the detection device 120, which can also be referred to as a sensor, can be considered as a controlled current source. The detection device 120 here outputs, as the detection signal 125, specific current level sequences depending on the angular velocity Ω of the wheel 102. For the detection, the electrical current or the detection signal 125 is passed through the current measurement resistors 231 and 241, and the voltage drop is determined. The active rotational speed sensor 120, or the detection device 120 can be used doubly, in that current measurement resistors 231 and 241 or shunts are used, one for each control unit, in a series circuit. The differential instrumentation amplifier 234 is used in addition with the high-side current measurement resistor or the first current measurement resistor 231 of the first control unit 130.

If the first control unit 130 and the second control unit 140 are both operating without fault, the first high-side switch 235 and the second low-side switch 246 are closed, while the first low-side switch 236 and the second high-side switch 245 are open. In such an operating state of the determination apparatus 110, electrical current flows out of the first control unit 130, through the first high-side switch 235, the first current measurement resistor 231, the detection device 120, the second current measurement resistor 241 and finally through the second switch low-side switch 246 to the second ground terminal 248. If one of the control units 130 or 140 fails, a supply and measurement can also take place independently. In this case, each of the switches in the faulty control unit are opened, and the switches in the control unit that is operating without fault are closed.

Alternatively, a switch arrangement can also be employed as the switch. The body diode of MOSFETs can have an effect through ground offsets. Two MOSFETs in series are therefore often used in reality. New possible positions at which the shunt can be placed then result from this.

Ground offsets, which can be caused by line resistances in feed lines and by different current consumptions on the part of the control units 130 and 140, lead to a changeable operating voltage of the detection device 120. If the detection device 120 operates in a voltage range between 8 and 20 volts, the ground offset can, for example, be limited to a maximum of 4 volts, this value depending on the supply voltage. In this concrete case, the mean value of the sensor operating voltage is (8 V+20 V)/2=14 V, while the distance from the boundary at 14 volts is 14 V−8 V=6 V.

THE LIST OF REFERENCE SIGNS IS AS FOLLOWS

100 Vehicle
102 Wheel
104 Braking system
110 Apparatus or determination apparatus
120 Detection device
125 Detection signal
130 First control unit
132 First measurement device
140 Second control unit
142 Second measurement device
Ω Angular velocity
231 First electrical current measurement resistor
233 First evaluation device
234 Differential instrumentation amplifier
235 First high-side switch
236 First low-side switch
237 First electrical voltage source
238 First ground terminal
241 Second electrical current measurement resistor
243 Second evaluation device
245 Second high-side switch
246 Second low-side switch
247 Second electrical voltage source
248 Second ground terminal
Vs Supply voltage
300 Method for determination
310 Step of detection
320 Step of measurement

The invention claimed is:

1. An apparatus for determining a rotational speed of at least one wheel of a vehicle, comprising:
a detection device for detecting an angular velocity of the wheel that is correlated to the rotational speed, wherein the detection device is configured to provide an electrical detection signal depending on the angular velocity detected;
a first control unit with a first measurement device for measuring the detection signal, wherein the first control unit is electrically joined to the detection device; and
a second control unit with a second measurement device for measuring the detection signal, wherein the second control unit is electrically joined to the detection device, wherein the detection device is electrically switchable or is electrically switched between the first measurement device and the second measurement device;
wherein the first control unit and the second control unit are connected via at least one electrical wire and a separate connection from the detection device to each of the first and second control units.

2. The apparatus of claim 1, wherein the first control unit includes at least one first switching device to interrupt a transmission of the detection signal between the first measurement device and the detection device for a malfunction of the first control unit, and wherein the second control unit includes at least one second switching device to interrupt a transmission of the detection signal between the second measurement device and the detection device for a malfunction of the second control unit.

3. The apparatus of claim 2, wherein the first measurement device is electrically connected between a first switching device and the detection device, and wherein the second measurement device is electrically connected between a second switching device and the detection device.

4. The apparatus of claim 1, wherein the detection device is configured to provide the detection signal with electrical current level sequences that depend on the angular velocity.

5. The apparatus of claim 1, wherein the first control unit is part of a first redundancy level of a braking system of the vehicle, and wherein the second control unit is part of a second redundancy level of the braking system of the vehicle.

6. The apparatus of claim 1, wherein the first measurement device includes a first electrical current measurement resistor and a first evaluation device for evaluating a voltage drop across the first current measurement resistor, and wherein the second measurement device includes a second electrical current measurement resistor and a second evaluation device for evaluating a voltage drop across the second current measurement resistor.

7. The apparatus of claim 6, wherein the second evaluation device is electrically connected in parallel with the second current measurement resistor, wherein the first measurement device includes a differential instrumentation amplifier that is electrically connected in parallel with the first current measurement resistor, and wherein the first evaluation device is connected to the instrumentation amplifier.

8. The apparatus of claim 6, wherein the first control unit includes a first high-side switch, a first low-side switch, a first electrical voltage source and a first ground terminal, wherein the first voltage source and the first ground terminal are electrically connected between the first high-side switch and the first low-side switch, wherein the first current measurement resistor is electrically connected between the first high-side switch and the detection device, wherein the second control unit includes a second high-side switch, a second low-side switch, a second electrical voltage source and a second ground terminal, wherein the second voltage source and the second ground terminal are electrically connected between the second high-side switch and the second low-side switch, and wherein the second current measurement resistor is electrically connected between the second low-side switch and the detection device.

9. The apparatus of claim 8, wherein the first control unit includes an additional first current measurement resistor that is electrically connected between the first voltage source and the first low-side switch or between the first low-side switch and the detection device, and wherein the second control unit includes an additional second current measurement resistor that is electrically connected between the detection device and the second high-side switch or between the second high-side switch and the second voltage source.

10. The apparatus of claim 1, wherein a first one of the pair of electrical lines is connected to the first measurement device, and wherein a second one of the pair of electrical lines is connected to the second measurement device.

11. A method for determining a rotational speed of at least one wheel of a vehicle, the method comprising:
  detecting, via a detection device of an apparatus, an angular velocity of the wheel that is correlated to the rotational speed making use of the detection device to provide an electrical detection signal depending on the angular velocity detected, wherein the apparatus includes the detection device, a first control unit with a first measurement device for measuring the detection signal, the first control unit being electrically joined to the detection device, and a second control unit with a second measurement device for measuring the detection signal, the second control unit being electrically joined to the detection device, the detection device being electrically switchable or is electrically switched between the first measurement device and the second measurement device; and
  measuring the detection signal making use of the first control unit when the first control unit is operating without fault, making use of the second control unit when the second control unit is operating without fault, and making use of the first control unit and the second control unit when the first control unit and the second control unit are operating without fault to determine the rotational speed;
  wherein the first control unit and the second control unit are connected via at least one electrical wire and a separate connection from the detection device to each of the first and second control units.

* * * * *